United States Patent
Limaye et al.

(10) Patent No.: US 8,966,230 B2
(45) Date of Patent: Feb. 24, 2015

(54) DYNAMIC SELECTION OF EXECUTION STAGE

(75) Inventors: Deepak Limaye, Austin, TX (US);
Kulin N. Kothari, Austin, TX (US);
James D. Allen, Austin, TX (US); James E. Phillips, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 12/571,379

(22) Filed: Sep. 30, 2009

(65) Prior Publication Data

US 2011/0078486 A1 Mar. 31, 2011

(51) Int. Cl.
*G06F 9/38* (2006.01)

(52) U.S. Cl.
CPC ............ *G06F 9/3836* (2013.01); *G06F 9/3873* (2013.01)
USPC ........................................................ 712/217

(58) Field of Classification Search
CPC .............................. G06F 9/3873; G06F 9/3836
USPC ........................................................ 712/217
See application file for complete search history.

(56) References Cited

U.S. PATENT DOCUMENTS

| | | |
|---|---|---|
| 5,043,868 A | 8/1991 | Kitamura et al. |
| 5,075,849 A | 12/1991 | Kuriyama et al. |
| 5,442,767 A | 8/1995 | Eickemeyer et al. |
| 5,487,153 A | 1/1996 | Hammerstrom et al. |
| 5,493,669 A | 2/1996 | Denman, Jr. |
| 5,542,058 A | 7/1996 | Brown et al. |
| 5,590,368 A | 12/1996 | Heeb et al. |
| 5,687,349 A | 11/1997 | McGarity |
| 5,701,426 A | 12/1997 | Ryan |
| 5,768,610 A | 6/1998 | Pflum |
| 5,812,813 A | 9/1998 | Henry et al. |
| 5,850,543 A | 12/1998 | Shiell et al. |
| 5,867,724 A | 2/1999 | McMahon |
| 5,915,117 A | 6/1999 | Ross et al. |
| 6,021,471 A | 2/2000 | Stiles et al. |
| 6,047,367 A | 4/2000 | Heller, Jr. |
| 6,065,103 A | 5/2000 | Tran et al. |
| 6,079,014 A | 6/2000 | Papworth et al. |
| 6,085,292 A | 7/2000 | McCormack et al. |
| 6,112,293 A | 8/2000 | Witt |
| 6,148,391 A | 11/2000 | Petrick |
| 6,209,076 B1 | 3/2001 | Blomgren |
| 6,219,778 B1 | 4/2001 | Panwar et al. |

(Continued)

FOREIGN PATENT DOCUMENTS

EP 0402787 12/1990

OTHER PUBLICATIONS

International Business Machines Corporation (IBM), z/Architecture Principles of Operations, Seventh Edition (Feb. 2008), SA22-7832-06, 1292 pages.

*Primary Examiner* — Andrew Caldwell
*Assistant Examiner* — Benjamin Geib
(74) *Attorney, Agent, or Firm* — Mnemoglyphics, LLC; Lawrence M. Mennemeier

(57) ABSTRACT

Methods and apparatus relating to dynamic selection of execution stage are described. In some embodiments, logic may determine whether to execute an instruction at one of a plurality of stages in a processor. In some embodiments, the plurality of stages are to at least correspond to an address generation stage or an execution stage of the instruction. Other embodiments are also described and claimed.

20 Claims, 6 Drawing Sheets

(56) References Cited

U.S. PATENT DOCUMENTS

| | | |
|---|---|---|
| 6,343,359 B1 | 1/2002 | Col et al. |
| 6,393,555 B1 | 5/2002 | Meier et al. |
| 6,412,043 B1 | 6/2002 | Chopra |
| 6,421,771 B1 | 7/2002 | Inoue |
| 6,678,638 B2 | 1/2004 | Takamura |
| 6,708,267 B1 | 3/2004 | Flacks et al. |
| 6,804,759 B2 | 10/2004 | Luick |
| 6,952,763 B1 | 10/2005 | Swaney et al. |
| 6,957,304 B2 | 10/2005 | Wilkerson |
| 7,028,165 B2 | 4/2006 | Roth et al. |
| 7,185,182 B2 * | 2/2007 | Col ............... 712/219 |
| 7,194,604 B2 | 3/2007 | Bigelow et al. |
| 7,861,064 B2 * | 12/2010 | Alexander et al. ........... 712/214 |
| 2002/0004989 A1 | 4/2002 | Inoue |
| 2002/0049895 A1 | 4/2002 | Inoue |
| 2004/0128448 A1 | 7/2004 | Stark et al. |
| 2005/0182918 A1 * | 8/2005 | Col ............... 712/218 |
| 2006/0095678 A1 | 5/2006 | Bigelow et al. |
| 2009/0217005 A1 * | 8/2009 | Alexander et al. ........... 712/208 |

\* cited by examiner

FIG. 5

| | 0 | 1 | 2 | 3 | 4 | 5 | 6 | 7 | 8 | 9 | 10 | 11 |
|---|---|---|---|---|---|---|---|---|---|---|---|---|
| Instruction 1 | Sched | Issue | Reg Read | Addr Gen | DC1 | ...DCn | Execute | | | | | |
| Instruction 2 | | STALL | STALL | STALL | Sched | Issue | Reg Read | Addr Gen | DC1 | ...DCn | Execute | |
| Instruction 3 | | | | | | Sched | Issue | Reg Read | Addr Gen | DC1 | ...DCn | Execute |

FIG. 6

| | 0 | 1 | 2 | 3 | 4 | 5 | 6 | 7 | 8 |
|---|---|---|---|---|---|---|---|---|---|
| Instruction 1 | Sched | Issue | Reg Read | Addr Gen | DC1 | ...DCn | Execute | | |
| Instruction 2 | | Sched | Issue | Reg Read | Addr Gen | DC1 | ...DCn | Execute | |
| Instruction 3 | | | Sched | Issue | Reg Read | Addr Gen | DC1 | ...DCn | Execute |

# DYNAMIC SELECTION OF EXECUTION STAGE

FIELD

The present disclosure generally relates to the field of electronics. More particularly, an embodiment of the invention relates to dynamic selection of execution stage.

BACKGROUND

Some processors may include an in-order pipeline. The processor pipeline may need to be stalled until it is determined that each piece of source data will be available by the time the instruction/micro-operation needs them. Data may be needed in one or more pipe stages, and can vary depending on the instruction/micro-operation. This stalling in turn adds latency and may degrade performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 3-6 illustrate diagrams associated with dynamic selection of execution stages, in accordance with some embodiments.

DETAILED DESCRIPTION

Figure 1:
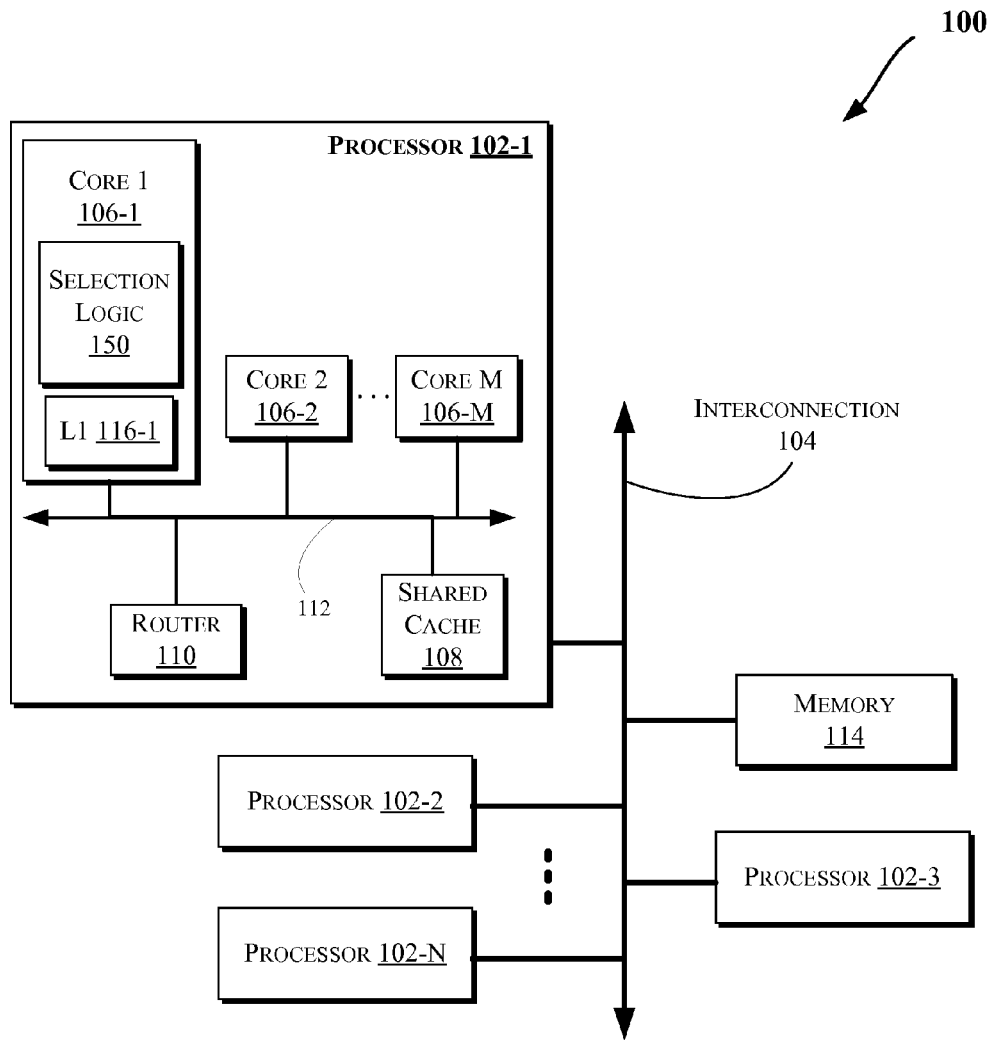
FIGS. 1 and 7-8 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation. Depending on implementation, each instruction may consist of one or more micro-operations. Also, depending on implementation, multiple instructions may combine to produce one or more micro-operations. Some embodiments may be equally applicable to these implementations. Therefore the use of "instruction" or "micro-operation" (which may also be referred to as "uop") herein may be interchangeable.

Some embodiments allow for one or more instructions to be scheduled for execution at one of a plurality of possible stages, e.g., within an in-order pipeline. In an embodiment, a scheduler may dynamically determine at which one of a multiple possible execution stages (e.g., within the same in-order processor pipeline) an instruction is to be executed. Furthermore, the scheduler may make such determinations for a plurality of different instructions.

Moreover, a processor pipeline may be an in-order Load-Op-Store pipeline. This is a pipeline where uops which have a memory source may complete the load part and then use a functional/execution unit on the result. This has a benefit of needing only one uop to be issued for most common memory related instructions instead of two (one uop for load and one uop for execution). This also allows a processor scheduler to issue the next instruction instead of stalling for multiple cycles while waiting for the load uop to return from one or more data cache access cycles with data. However, many uops may need their sources earlier in the pipeline (e.g., at the Address Generation Stage) than regular executing instructions (at the Execution Stage). As a result these instructions may stall the pipeline and significantly degrade performance.

As discussed herein, some embodiments, allow for instruction(s) to be executed at more than one possible location in an in-order processor pipeline. For example, some instruction(s) may be dynamically chosen to execute at either an address generation stage or an execution stage of an in-order processor pipeline, which may in turn eliminate or at least reduce stalls in many situations. In an embodiment, instruction(s) (including those which are to be executed at a different stage) may be executed speculatively or non-speculatively.

Techniques described herein may allow for improved performance in various computing devices, such as those discussed for example with reference to FIGS. 1-8. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (MLC) (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown).

Also, processor 102-1 may include a prefetch engine (not shown) which may prefetch data from memory 114 (or another cache level) into one of the caches discussed above. As shown, processor core 106 may include a selection logic 150, e.g., to determine at what stage of a processor pipeline to schedule an instruction for execution, as will be further discussed herein, e.g., with reference to FIGS. 2-8. Furthermore, even though some figures illustrate logic 150 to be inside a processor or core, logic 150 may be provided within other components of computing systems discussed herein, such as within components of systems discussed with reference to FIG. 1, 7, or 8.

Figure 2:
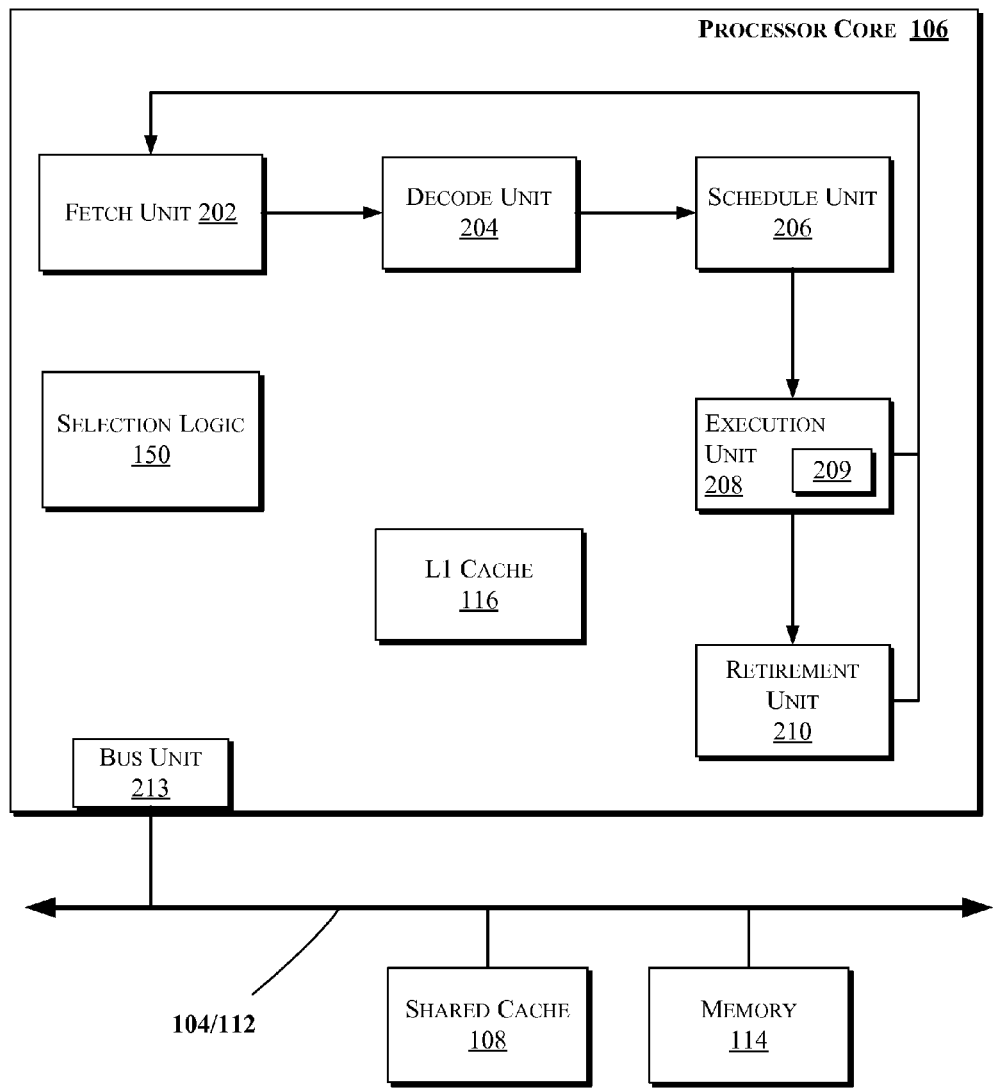
FIG. 2 illustrates a block diagram of portions of a processor core and other components of a computing system, according to an embodiment of the invention.

FIG. 2 illustrates a block diagram of portions of a processor core and other components of a computing system, according to an embodiment of the invention. In an embodiment, at least some of processors discussed herein (e.g., with reference to FIGS. 1 and 3-8) may include one or more of the component of the processor core 106 shown in FIG. 2. Also, a processor may include a single or multi-core 106, which may be homogeneous/symmetric or heterogeneous/asymmetric, etc. such as discussed herein, e.g., with reference to FIGS. 1 and 3-8. In one embodiment, the arrows shown in FIG. 2 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components. Each of the units may consist of one or more sub-units with one or more pipe stages. Each of the units could handle one or more uops simultaneously.

As illustrated in FIG. 2, the processor core 106 may include a fetch unit 202 to fetch instructions for execution by the core 106. The instructions may be fetched from any storage devices such as the memory 114 and/or the memory devices discussed with reference to FIG. 7 or 8. The core 106 may optionally include a decode unit 204 to decode the fetched instruction. In an embodiment, the decode unit 204 may decode the fetched instruction into a plurality of uops (microoperations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available.

In one embodiment, the schedule unit 206 may schedule and/or issue (or dispatch) decoded instructions to an execution unit 208 for execution. The execution unit 208 may execute the dispatched instructions after they are dispatched (e.g., by the schedule unit 206) and, if applicable, decoded (e.g., by the decode unit 204). In an embodiment, the execution unit 208 may include more than one execution/functional unit, such as one or more memory execution units, one or more integer execution units, one or more floating-point execution units (209), or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions in-order or out-of-order. Hence, the processor core 106 may be an in-order or an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may further include the selection logic 150 (such as the selection logic 150 discussed with respect to FIG. 1). The selection logic 150 may determine at what stage of a processor pipeline to schedule an instruction for execution, as will be further discussed herein, e.g., with reference to FIGS. 3-8. In an embodiment, schedule unit 206 may include the selection logic 150. Additionally, the core 106 may include a bus unit 213 to allow communication between components of the processor core 106 and other components (such as the components discussed with reference to FIG. 1, 7, or 8) via one or more buses (e.g., buses 104 and/or 112).

FIGS. 3-6 illustrate sample processor pipelines from instruction schedule stage to execution stage, according to some embodiment. As shown, one or more instructions (e.g., labeled as instruction 1, instruction 2, and instruction 3) are shown to proceed through various pipeline stages (where each stage is indicated to occur at consecutively numbered sample cycle index (e.g., 0 through 10). In an embodiment, the enumerated cycles may correspond to clock cycles of the processor core.

In some embodiments, the selection logic 150 may dynamically determine and cause some instruction(s) (e.g., by sending one or more signals to the schedule unit 206) to be chosen to schedule or execute at one of a plurality of possible stages. In an embodiment, such instruction(s) may be caused to execute at either the Address Generation Stage or the Execution Stage. This may eliminate scheduler stalls for these instruction(s) in at least some scenarios. At least some of these embodiments may utilize some arithmetic hardware available at the Address Generation stage (as discussed with reference to execution unit 208 of FIG. 2). Such hardware may be used to calculate memory uop addresses. This hardware could be opportunistically reused for certain uops. In addition, one or more other execution units may be added or made accessible to the Address Generation Stage to allow for more uops to execute either before or after the load uop. This in turn may cause a large performance boost for most benchmark categories.

Additionally, while two points in the pipeline are mentioned specifically, instructions may be executed at multiple points, e.g., where resources are available and an instruction may execute. For instance, other possible points may be at a dedicated floating point adder (which is also capable of integer execution) or a late single-cycle or multi cycle execution unit, or execution units coupled to local buffering that would allow that execution unit to dynamically align as needed with respect to other pipelines in the processor.

Figure 3:
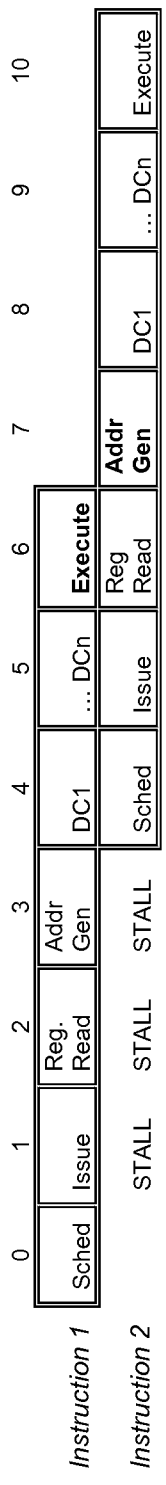

Referring to FIG. 3, an early execution example is shown. In one embodiment, Instruction 1 may be "add % ebx, % eax" (where this instruction adds the data of register ebx into register eax) and Instruction 2 may be "mov (% eax), % edx" (where this instruction is a memory load instruction and uses eax as a source for the memory address and loads the data from that memory address into register edx). Accordingly, Instruction 2 is dependent on the results of Instruction 1.

As shown in FIG. 3, Instruction 1 may in-order follow a schedule, issue, register read, address generation, one or more data cache cycles (e.g., DC0 through DCn, where n is an integer). Instruction 2 however may need to stall until Instruction 1 has fully executed (e.g., to allow a source data required by instruction 2 to become available, for example, after cycle 6). In turn, instruction 2 may proceed to address generation and one or more data cache cycles after instruction 1 has executed.

Figure 4:
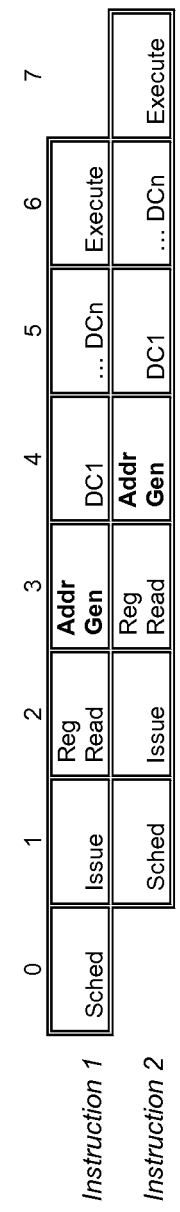

Accordingly, in the early execution example of FIG. 3, an add instruction (e.g., Instruction 1) may have its result used as an address for another instruction (e.g., Instruction 2). However, if the sources of Instruction 1 would be ready by the time it would hit the address generation stage, it could be executed there since there already is adder hardware present in an embodiment. This could eliminate the scheduler unit stall, as shown in FIG. 4. Moreover, the decision to execute the instruction (in this case the add instruction) earlier in the pipeline is made at the scheduler unit 206, e.g., based on a signal received from the selection logic 150 that indicates a determination by the selection logic 150 regarding where to schedule the instruction for execution. If the instruction's sources will be ready when it reaches the Addr Gen stage, and the Addr Gen Stage has the appropriate hardware, data instruction is issued immediately and marked to execute early. If not, a check maybe made if the sources for the instruction would be ready when it reaches the regular execution stage. If so, it is again issued immediately but marked to execute in the late execution stage. If neither is true, then the scheduling is stalled until one of the conditions is met. Accordingly, FIG. 4 illustrates that scheduler unit stall may be eliminated with early ALU uop execution in accordance with one embodiment.

Referring to FIG. 5, a late execution example is shown. In one embodiment, Instruction 1 may be "xor % ebx, % eax" (where this instruction performs an exclusive OR (XOR) of registers ebx and eax), Instruction 2 may be "lea (% ebp, % eax), % ebp" (where this instruction performs a load effective address), and Instruction 3 may be "xor % ebp, % edx" (where this instruction performs an XOR of ebp and edx). At least one Instruction Set Architecture (ISA) may provide a number of different ways on how an address can be computed to feed a memory instruction. For example, a simple addition or subtraction may be performed to compute an address and then feed that address to a memory instruction. LEA or "load effective address" as discussed herein refers to one example designed to compute an address for a memory instruction but that is not envisioned to be the only way to compute an address in various embodiments. Accordingly, the term "load effective address" in this application is intended to refer to a general operation of computing an address and not necessarily mean "LEA" in every embodiment.

Furthermore, in some embodiments, uops such as LEAs (Load Effective Address) may be used to compute addresses for memory uops but may also be used in other scenarios. Generally, an LEA (register, memory) may load the specified register with the offset of the specified memory location. These are executed in the Addr Gen Stage, so that they may immediately feed a dependent memory uop that needs that output at the address generation stage. But as stated earlier, these instructions may also be used as regular ALU uops. In this scenario, they may cause stalls when sourcing another ALU uop and cause performance degradation. Consider the example illustrated in FIG. 5, where Instruction 2 is stalled until Instruction 1 completes its address generation. These stalls may also be eliminated in at least some scenarios. The scheduler unit may for example dynamically choose to force the LEA to execute in the Execute Stage (e.g., based on a determination made by the selection logic 150), since it only needed a two input adder, which exists in that stage in an embodiment. Shown in FIG. 6 is the resultant behavior. As shown in FIG. 6, late LEA execution may eliminate the scheduler unit stall present in FIG. 5. In an embodiment, the decision to execute the instruction (in this case the LEA) later in the pipeline is made at the scheduler unit based on the determination made by the selection logic 150.

The above early execution example is illustrated using an add instruction, but the hardware already present in the Address Generation stage may allow similar operations on Add, Subtract, and Move instructions. In addition other execution units could be added (or otherwise made accessible) to the Address Generation Stage to allow more uops to execute either before or after the load pipeline. For instance, certain Shift instructions may also be dynamically tied to early or late execution.

Figure 7:
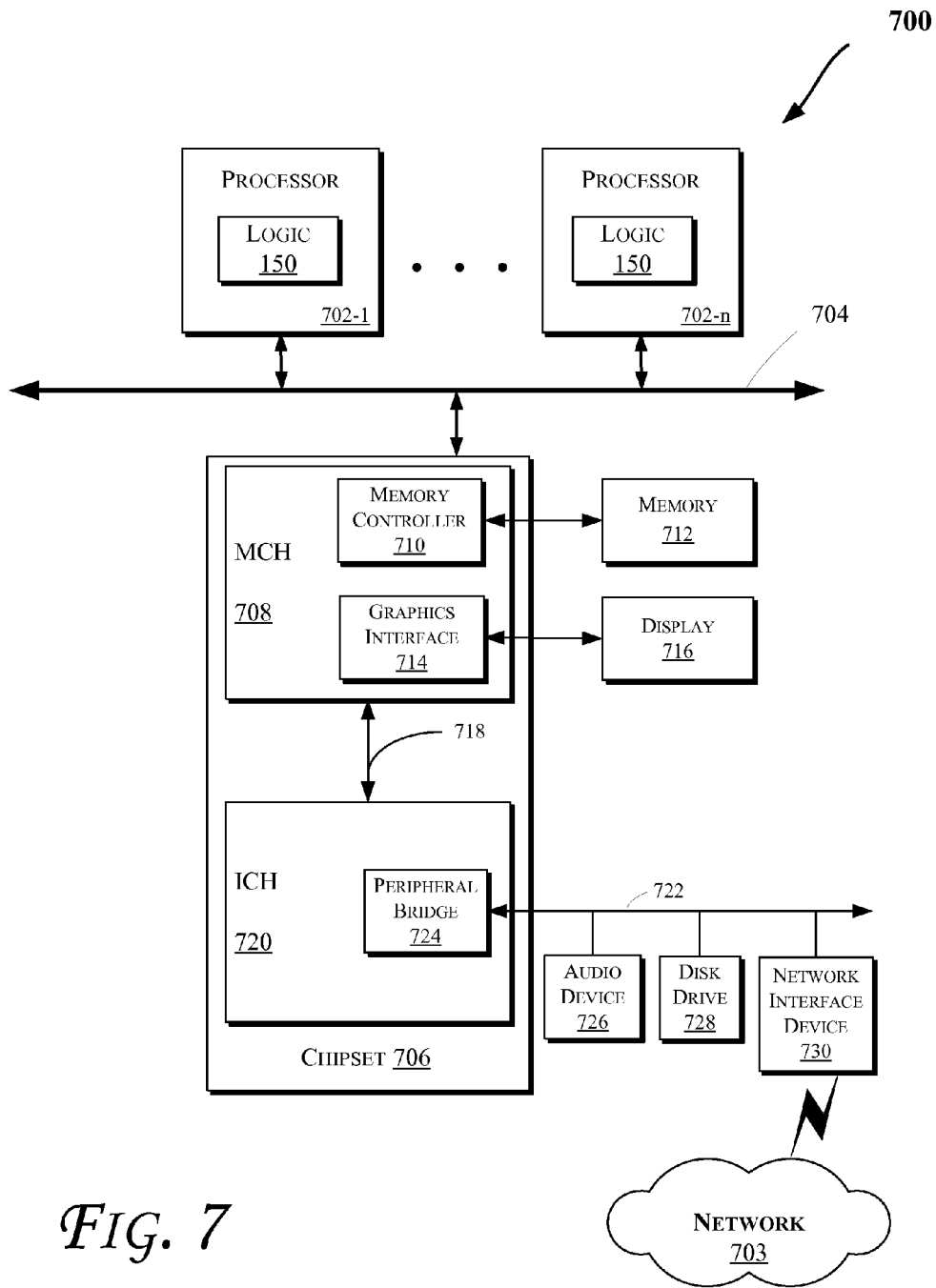

FIG. 7 illustrates a block diagram of a computing system 700 in accordance with an embodiment of the invention. The computing system 700 may include one or more central processing unit(s) (CPUs) 702 or processors that communicate via an interconnection network (or bus) 704. The processors 702 may include a general purpose processor, a network processor (that processes data communicated over a computer network 703), or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors. In an embodiment, one or more of the processors 702 may be the same or similar to the processors 102 of FIG. 1. For example, one or more of the processors 702 may include one or more of the caches, storage devices, and/or logic 150 discussed with reference to FIGS. 1-6. Also, the operations discussed with reference to FIGS. 1-6 may be performed by one or more components of the system 700.

A chipset 706 may also communicate with the interconnection network 704. The chipset 706 may include a memory control hub (MCH) 708. The MCH 708 may include a memory controller 710 that communicates with a memory 712 (which may be the same or similar to the memory 114 of FIG. 1). The memory 712 may store data, including sequences of instructions, that may be executed by the CPU 702, or any other device included in the computing system 700. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 704, such as multiple CPUs and/or multiple system memories.

The MCH 708 may also include a graphics interface 714 that communicates with a display device 716. In one embodiment of the invention, the graphics interface 714 may communicate with the display device 716 via an accelerated graphics port (AGP). In an embodiment of the invention, the display 716 (such as a flat panel display) may communicate with the graphics interface 714 through, for example, a signal converter that translates a digital representation of an image stored in a storage device such as video memory or system memory into display signals that are interpreted and displayed by the display 716. The display signals produced by the display device may pass through various control devices before being interpreted by and subsequently displayed on the display 716.

A hub interface 718 may allow the MCH 708 and an input/output control hub (ICH) 720 to communicate. The ICH 720 may provide an interface to I/O device(s) that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730 (which is in communication with the computer network 703). Other devices may communicate via the bus 722. Also, various components (such as the network interface device 730) may communicate with the MCH 708 in some embodiments of the invention. In addition, the processor 702 and other components shown in FIG. 7 (including but not limited to the MCH 708, one or more components of the MCH 708, etc.) may be combined to form a single chip. Furthermore, a graphics accelerator may be included within the MCH 708 in other embodiments of the invention.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 8:
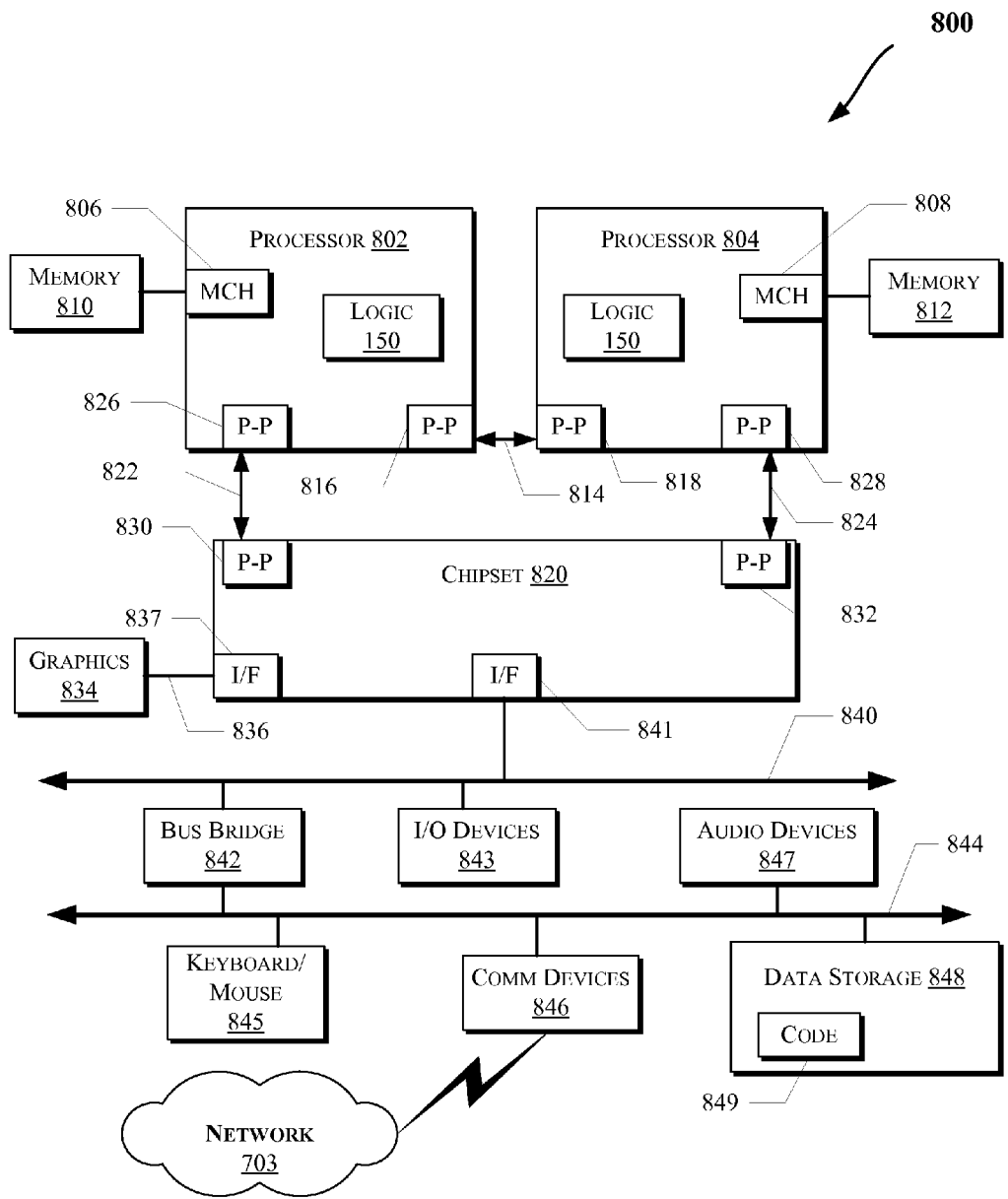

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712 of FIG. 7.

In an embodiment, the processors 802 and 804 may be one of the processors 702 discussed with reference to FIG. 7, e.g., including one or more of the caches discussed with reference to FIGS. 1-7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a graphics circuit 834 via a graphics interface 836, e.g., using a PtP interface circuit 837.

At least one embodiment of the invention may be provided within the processors 802 and 804. For example, one or more of the cores 106 of FIG. 1 may be located within the processors 802 and 804. Also, processors 802 and 804 may include one or more of the caches, storage devices, and/or logic 150 discussed with reference to FIGS. 1-7. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

The chipset 820 may communicate with a bus 840 using a PtP interface circuit 841. The bus 840 may communicate with one or more devices, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 703), audio I/O device 847, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   logic to determine whether to execute a first instruction at a first stage of a plurality of stages or at a second stage of the plurality of stages later than the first stage;
   a schedule unit to schedule the first instruction for execution at the second stage based on a determination by the logic that a next sequential instruction needs a result of the first instruction at the second stage; and
   the schedule unit to schedule the first instruction for execution at the first stage based on a determination by the logic that the source for the first instruction is to be ready at the first stage, or that the next sequential instruction needs the result of the first instruction at the first stage.

2. The processor of claim 1, wherein the plurality of stages are to at least correspond to an address generation stage or an execution stage of the first instruction.

3. The processor of claim 1, wherein the source of the first instruction is to be provided based on an execution result of a second instruction.

4. The processor of claim 3, wherein the schedule unit is to schedule the second instruction prior to the first instruction.

5. The processor of claim 3, wherein the first instruction is to reach address generation in a first clock cycle and the second instruction is to reach address generation in a second clock cycle, wherein the first clock cycle is to be a next clock cycle after the second clock cycle.

6. The processor of claim 3, wherein the second instruction is to cause execution of one or more of a plurality of instructions.

7. The processor of claim 1, further comprising a memory to store the first instruction.

8. The processor of claim 1, further comprising an in-order pipeline that comprises one or more of: a schedule stage, an issue stage, a register read stage, an address generation stage, one or more data cache cycles stages, and an execution stage.

9. The processor of claim 1, wherein the first instruction is to cause execution of one or more of a plurality of instructions.

10. The processor of claim 1, further comprising one or more processor cores, wherein at least one of the one or more processor cores is to comprise the logic to determine.

11. A method comprising:
    determining whether to execute a first instruction at a first stage of a plurality of stages or at a second stage of the plurality of stages later than the first stage;
    determining whether a source for the first instruction is to be ready at the first stage;
    executing the first instruction at the second stage based on a determination that a next sequential instruction needs a result of the first instruction at the second stage; and
    executing the first instruction at the first stage based on the determination that the source for the first instruction is to be ready at the first stage, or that the next sequential instruction needs the result of the first instruction at the first stage.

12. The method of claim 11, wherein the plurality of stages are to at least correspond to an address generation stage or an execution stage of the first instruction.

13. The method of claim 11, further comprising executing a second instruction, wherein the source of the first instruction is to be provided based on an execution result of the second instruction.

14. The method of claim 11, further comprising storing the first instruction in a memory.

15. The method of claim 11, further comprising executing the first instruction to cause execution of one or more of a plurality of instructions.

16. A system comprising:
    a memory to store a first instruction and a second instruction, wherein an execution result of the first instruction is to provide a source of the second instruction; and
    a processor to execute the first or second instructions, the processor to comprise:
    a first logic to determine whether to execute the second instruction at a first stage of a plurality of stages or at a second stage of the plurality of stages later than the first stage;
    a second logic to cause execution of the second instruction at the second stage based on a determination by the first logic that a next sequential instruction needs the result of the second instruction at the second stage; and
    the second logic to cause execution of the second instruction at the first stage based on a determination by the first logic that the source for the second instruction is to be ready at the first stage, or that the next sequential instruction needs the result of the second instruction at the first stage.

17. The system of claim 16, wherein the plurality of stages are to at least correspond to an address generation stage or an execution stage of the second instruction.

18. The system of claim 16, wherein the second instruction is to reach address generation in a first clock cycle and the first instruction is to reach address generation in a second clock cycle, wherein the first clock cycle is to be a next clock cycle after the second clock cycle.

19. The system of claim 16, wherein the first instruction or the second instruction are to cause execution of one or more of a plurality of instructions.

20. The system of claim 16, further comprising an audio device coupled to the processor.

* * * * *